Patented Apr. 3, 1951

2,547,723

UNITED STATES PATENT OFFICE 2,547,723

CHEMICALS AND FUNGICIDES

Norman K. Sundholm, Naugatuck, Conn., assignor to United States Rubber Company, New York, N. Y., a corporation of New Jersey No Drawing. Application December 8, 1949, Serial No. 131,919

12 Claims. (Cl. 167—33)

This invention relates to new chemicals which are useful as fungicides.

The chemicals of the present invention are 2-iminonaphtho[2,3]-1,3.-dithiole-4,9-diones in which the hydrogen of the imino group is substituted by a functionally aliphatic radical, and the product of the hydrolysis of such compounds, namely, naphtho[2,3]-1,3-dithiole-2,4,9-trione.

These compounds are named according to the scheme for ring system number 1615 in "The Ring Index," American Chemical Society Monograph No. 84 by Patterson and Capell. The structural formula for the 2-iminonaphtho[2,3]-1,3-dithiole-4,9-diones is

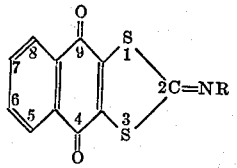

where R is a functionally aliphatic radical, i. e., where R is an alkyl, haloalkyl, cyanoalkyl or aralkyl radical. Examples of such alkyl radicals are methyl, ethyl, n-propyl, n-butyl, n-amyl, n-hexyl, isoamyl, isobutyl, sec-butyl, n-octyl, n-decyl and n-dodecyl radicals. Examples of such haloalkyl radicals are chloromethyl, beta-chloroethyl and beta-bromoethyl radicals. Examples of such cyanoalkyl radicals are cyanomethyl and beta-cyanoethyl radicals. Examples of such aralkyl radicals are benzyl and beta-phenethyl radicals. For economic reasons, the 2-alkyliminonaphtho[2,3]-1,3-dithiole-4,9-diones are the present preferred embodiments. The structural formula for the naphtho[2,3]-1,3-dithiole-2,4,9-trione is

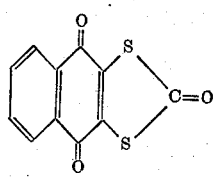

The chemicals represented by the foregoing two structural formulae may be said to have generically the following structural formula:

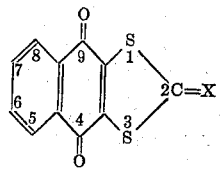

where X is oxygen or an imino group in which the hydrogen is substituted by a functionally aliphatic radical, such as the R in the first structural formula above.

The 2-iminonaphtho[2,3]-1,3-dithiole-4,9-diones are prepared by reacting 2,3-dichloro-1,4-naphthoquinone with a salt of an N-monosubstituted dithiocarbamic acid in which the N-substituent is a functionally aliphatic group, such as the R in the first structural formula above. Such dithiocarbamates with various functionally aliphatic monosubstituents in the amino group, such as alkyl, haloalkyl, cyanoalkyl and aralkyl radicals, are commercially well-known dithiocarbamates and the functionally aliphatic substituent in the amino group of the dithiocarbamate may be selected to give the desired substituent in the imino group in the 2-iminonaphtho[2,3]-1,3-dithiole-4,9-dione.

The 2-iminonaphtho[2,3]-1,3-dithiole-4,9-diones of the present invention are prepared according to the following two-step sequence:

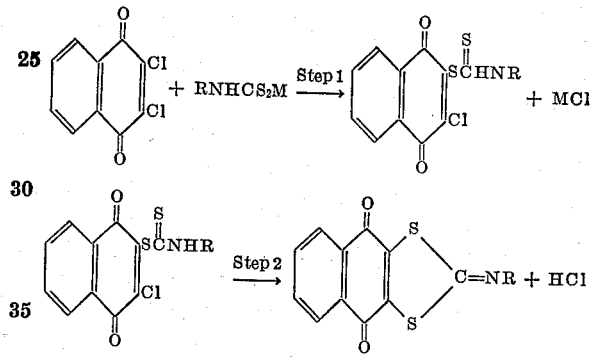

In the above reactions, M represents a member of the alkali group, such as sodium, potassium, ammonium or substituted ammonium (amine), which give the common water-soluble alkali dithiocarbamates. The R represents a functionally aliphatic group, such as alkyl, haloalkyl, cyanoalkyl or aralkyl, as exemplified in the R in the first structural formula above. As these various N-monosubstituted dithiocarbamates are common commercial chemicals, it is an easy matter to select the substituent in the amino group of the dithiocarbamate to give the desired substituent in the imino group in the chemical of the invention as prepared according to the above reactions. In carrying out the above reactions, the first step proceeds readily on mixing the reactants at room temperature in a liquid medium, for example, water. The second step proceeds at moderately elevated temperatures; this step has been carried out by adding the product of the first step to an organic solvent such as ethanol and boiling the mixture. It is advisable to carry out the two reactions in sequence since the hydrochloric acid formed in the second step would decompose the dithiocarbamate salt reactant in the first step.

The 2 - iminonaphtho[2,3] - 1,3 - dithiole - 4,9-diones prepared as above may be readily hydrolyzed with dilute mineral acid to naphtho [2,3]-1,3-dithiole-2,4,9-trione as shown in the following hydrolysis reaction:

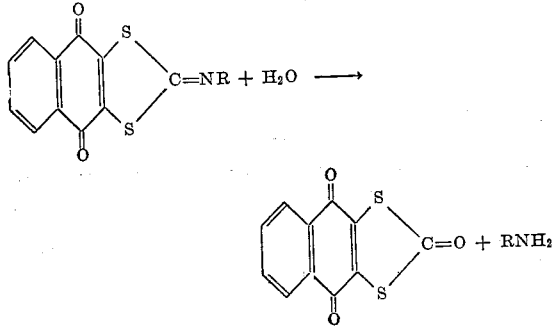

The chemicals of the present invention are effective fungicides. They may be applied to plants (the term "plants" including plant parts, e. g. seeds) directly, or in an inert medium as a dust in admixture with a powdered solid carrier, such as the various mineral silicates, e. g. mica, talc, pyrophyllite and clays, or as an aqueous spray in suspension in water. They may be applied in admixture with small amounts of a surface-active agent which may be an anionic surface-active agent, a non-ionic surface-active agent, or a cationic surface-active agent, and which acts as a wetting agent for the chemical. They may be applied as in foliage treatment in an aqueous suspension containing such a surface-active agent as a dispersing agent. The chemicals of the invention may also be admixed with powdered solid carriers, such as mineral silicates, together with a small amount of such a surface-active agent so that a wettable powder may be obtained which may be applied directly to plants, or which may be shaken up with water to readily prepare a suspension of the chemical (and powdered carrier) in water for application to plants in that form. In fungicidal compositions such as described above, the concentration of the surface-active agent may be from 0.05 to 5% by weight based on the chemicals of the present invention.

The anionic surface-active agents that may be used in the present fungicidal compositions are those having a general formula selected from the group consisting of R—COOM, R—SO₃M, and R—OSO₃M, where M represents alkali-metal, ammonium or substituted ammonium (amine) radical, and R represents an organic radical containing at least one group having more than 8 carbon atoms. Examples of such anionic surface-active agents are:

(1) Soaps (e. g. sodium laurate, ammonium stearate, diethanolammonium oleate).

(2) Alkyl sulfonates (e. g. dodecyl sodium sulfonate, cetyl potassium sulfonate.

(3) Alkyl sulfates (e. g. sodium dodecyl sulfate, sodium oleyl sulfate).

(4) Sulfonated ethers of long and short chain aliphatic groups (e. g.

C₁₇H₃₃—O—C₂H₄—SO₃—Na)

(5) Sulfated ethers of long and short chain aliphatic groups (e. g.

C₁₇H₃₃—O—C₂H₄—O—SO₃Na)

(6) Sulfonated alkyl esters of long chain fatty acids (e. g.

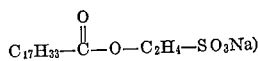

(7) Sulfonated glycol esters of long chain fatty acids (e. g.

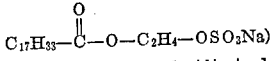

(8) Sulfonated alkyl substituted amides of long chain fatty acids (e. g.

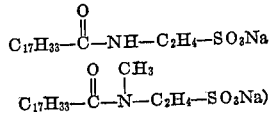

(9) Alkylated aryl sulfonates (e. g. isopropyl naphthalene sodium sulfonate, dodecyl benzene sodium sulfonate).

(10) Hydroaromatic sulfonates (e. g. tetrahydro-naphthalene sodium sulfonate).

(11) Alkyl sulfosuccinates (e. g. dioctyl sodium sulfosuccinate).

(12) Aryl sulfonate-formaldehyde condensation products (e. g. condensation product of formaldehyde and sodium naphthalene sulfonate,

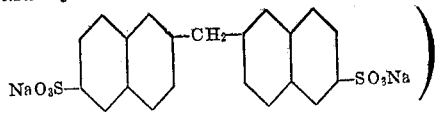

Non-ionic surface-active agents that may be used in the present fungicidal compositions are:

(1) Monoethers of polyglycols with long-chain fatty alcohols, such as reaction products of ethylene oxide or polyethylene glycol with a long-chain fatty alcohol (e. g. reaction product of ethylene oxide and oleyl alcohol, viz:

$$C_{18}H_{35}—(OC_2H_4)_nOH$$

where $n$ is 10 to 20).

(2) Monoesters of polyglycols with long chain fatty acids, such as reaction products of ethylene oxide or polyethylene glycol with a long chain fatty acid (e. g. reaction product of ethylene oxide or polyethylene glycol with oleic acid, viz:

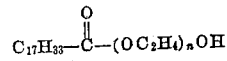

where $n$ is 10 to 20).

(3) Monoethers of polyglycols with alkylated phenols, such as reaction products of ethylene oxide or polyethylene glycol with an alkyl phenol (e. g. reaction product of ethylene oxide and isopropyl phenol, viz:

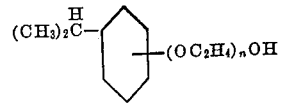

where $n$ is 10 to 20).

(4) Partial esters of polyhydric alcohols with long chain monocarboxylic (fatty and/or resin) acids (e. g. glycerol monostearate, sorbitan trioleate).

(5) Partial and complete esters of long chain monocarboxylic (fatty and/or resin) acids with polyglycol ethers of polyhydric alcohols (e. g. tristearic acid ester of polyglycol ether of sorbitan, or so-called polyoxyethylene sorbitan tristearate; hexaoleic acid ester of polyglycol ether of sorbitol, or so-called polyoxyethylene sorbitol hexaoleate).

Cationic surface-active agents that may be used in the present fungicidal compositions are:

(1) Quaternary ammonium salts in which one of the groups attached to the nitrogen is an aliphatic group having at least 8 carbon atoms (e. g. trimethyl cetyl ammonium iodide, lauryl pyridinium chloride, cetyl dimethyl benzyl ammonium chloride, N-stearyl betaine).

(2) Amines, amides, diamines and glyoxalidines having an aliphatic group containing at least 8 carbon atoms, and their acid esters (e. g. stearylamine hydrochloride, oleyl amide, diethylethylene oleyl diamine, 2-heptadecyl N-hydroxyethyl glyoxalidine).

The following is illustrative of the preparation of the chemicals of the invention:

EXAMPLE I

*Preparation of 2-methyliminonaphtho[2,3]-1,3-dithiole-4,9-dione*

A solution of methylammonium methyldithiocarbamate prepared in the usual manner from 254 grams (0.84 mole) of 10.2% methylamine and 33.4 grams (0.44 mole) of carbon disulfide was added during fifty minutes to a well-agitated suspension of 90.8 grams (0.40 mole) of finely-ground 2,3-dichloro-1,4-naphthoquinone in 300 ml. of water containing a small amount of a commercial wetting agent, which was a sodium alkyl naphthalene sulfonate. Due to the heat of reaction there was about a 15° C. rise in the temperature of the mixture. No cooling was applied. After one fifth of the dithiocarbamate solution had been added, the suspension had lost its finely-divided character, consisting, instead, of a soft sticky mass suspended in the aqueous layer. After stirring for twenty hours, the organic layer had again become solid and appeared to be quite finely divided. The mixture was filtered and the residue washed with water and air-dried to give 106 grams of maroon product melting and decomposing above 220° C. Fourteen grams of this material was added to 2 liters of ethanol and the mixture boiled for several minutes. It was filtered hot (3.5 grams of the product did not dissolve) and the filtrate allowed to stand in an icebox for two days. The crystals which separated were recrystallized from ethanol to give 3.5 grams of red-violet crystals melting at 185–186° C.

*Analysis.*—Calculated for $C_{12}H_7NO_2S_2$: N, 5.36; S, 24.52. Found: N, 5.47; S, 24.32.

EXAMPLE II

*Preparation of 2-ethyliminonaphtho[2,3]-1,3-dithiole-4,9-dione*

Ethylammonium ethyldithiocarbamate was reacted with 2,3-dichloro-1,4-naphthoquinone employing the procedure described for the preparation of the 2-methylimino compound in Example I. The crude product (before crystallization) was plum-colored and melted with decomposition at 231–235° C. Some of this material was crystallized three times from ethanol to give small, dark red needles melting at 192–193° C.

*Analysis.*—Calculated for $C_{13}H_9NO_2S_2$: N, 5.09; S, 23.27. Found: N, 5.02; S, 23.28.

EXAMPLE III

*Preparation of naphtho[2,3]-1,3-dithiole-2,4,9-trione*

Two-tenths gram of 2-methyliminonaphtho[2,3]-1,3-dithiole-4,9-dione prepared as in Example I was added to a mixture of 10 ml. of concentrated hydrochloric acid, 50 ml. of water, and 60 ml. of ethanol. The mixture was refluxed for forty-five minutes, the solid dissolving within fifteen minutes. On cooling the mixture, tan crystals separated. They were collected and crystallized twice from ethanol, treating the solution with decolorizing charcoal and cooling the filtrate quickly in an ice-bath each time, to give 0.04 gram (21% of theory) of golden yellow needles melting at 169–169.5° C. When the filtrate was permitted to cool slowly to room temperature, the compound began to crystallize as golden yellow needles. However, after standing about an hour, a small amount of brown-red granules also crystallized. When the mixture was allowed to stand for two days at room temperature, the needles were completely transformed to the brown-red granules which also melted at 169–169.5° C. Since these two crystalline forms gave a mixed melting point which was not depressed and gave equivalent analytical results, they apparently are different crystalline forms of this compound.

*Analysis.*—Calculated for $C_{11}H_4O_3S_2$: C, 53.23; H, 1.61. Found: (for needles) C, 53.17; H, 1.50; (for granules) C, 53.19; H, 1.51.

The effectiveness of the chemicals of the invention as fungicides is illustrated in the following:

EXAMPLE IV

The compounds of Examples I and III were each ground with 1% of a sodium alkyl aryl sulfonate, a surface-active agent known to be nontoxic to the pathogen used in the test. The mixtures of the compounds and surface-active dispersing agent were then agitated in distilled water at a concentration of 2000 parts per million to form an aqueous suspension of the compounds. Duplicate 6-inch tomato plants of the variety Bonny Best were sprayed for 20 seconds at 20 pounds air pressure with the aqueous suspensions. After the spray deposit was thoroughly dry (20 hours), the plants and four comparable untreated (check) plants were sprayed with an aqueous suspension of spores of the early blight fungus, *Alternaria solani*. The plants were held for 20 hours at 75° F. and 99% relative humidity to permit spore germination and infection before removing them to a greenhouse. Records were taken five days later on the number of lesions produced on the 15 major leaflets of the three youngest fully expanded leaves. The data were converted to percentage of control on the basis of the average number of lesions on the four check plants. The percentages of control given by the compounds were: 2-methyliminonaphtho[2,3]-1,3-dithiole-4,9-dione, 93; naphtho[2,3]-1,3-dithiole-2,4,9-trione, 97.

Having thus described my invention, what I claim and desire to protect by Letters Patent is:

1. A compound of the structural formula

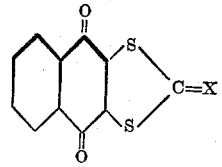

where X is selected from the group consisting of O and NR in which R is a radical of the group consisting of alkyl, haloalkyl, cyanoalkyl and aralkyl radicals.

2. 2-alkyliminonaphtho[2,3]-1,3-dithiole-4,9-dione.

3. 2-methyliminonaphtho[2,3]-1,3-dithiole-4,-9-dione.

4. Naphtho[2,3]-1,3-dithiole-2,4,9-trione.

5. The method of preparing a 2-iminonaphtho[2,3]-1,3-dithiole-4,9-dione which comprises reacting 2,3-dichloro-1,4-naphthoquinone with an N-monosubstituted dithiocarbamate salt.

6. The method of preparing naphtho[2,3]-1,3-dithiole-2,4,9-trione which comprises hydrolyzing 2-iminonaphtho[2,3]-1,3-dithiole-4,9-dione in which the hydrogen of the imino group is substituted by a radical selected from the group consisting of alkyl, haloalkyl, cyanoalkyl and aralkyl radicals.

7. A fungicidal composition comprising 2-methyl-iminonaphtho[2,3]-1,3-dithiole-4,9-dione, and a surface-active dispersing agent.

8. A fungicidal composition comprising naphtho [2,3]-1,3-dithiole-2,4,9-trione, and a surface-active dispersing agent.

9. A fungicidal composition comprising 2-nethyl-iminonaphtho[2,3]-1,3-dithiole-4,9-dione, and a powdered solid carrier.

10. A fungicidal composition comprising naphtho [2,3]-1,3-dithiole-2,4,9-trione, and a powdered solid carrier.

11. A fungicidal composition comprising an aqueous suspension of 2-methyliminonaphtho [2,3]-1,3-dithiole-4,9-dione, and a surface-active agent.

12. A fungicidal composition comprising an aqueous suspension of naptho[2,3]-1,3-dithiole-2,4,9-trione, and a surface-active agent.

NORMAN K. SUNDHOLM.

No references cited.